B. W. TUTHILL.

Wheelbarrow.

No. 4,341. Reissued Apr. 11, 1871.

Witnesses:

A. Bonneuendorf

L. S. Moabee

Inventor:

B. W. Tuthill

PER Munn & Co

Attorneys.

United States Patent Office.

BECKWITH W. TUTHILL, OF OREGON CITY, OREGON.

Letters Patent No. 110 698, dated January 3, 1871; reissue No. 4,341, dated April 11, 1871.

IMPROVEMENT IN WHEELBARROW-FRAMES.

The Schedule referred to in these Letters Patent and making part of the same.

*To all whom it may concern:*

Be it known that I, BECKWITH W. TUTHILL, of Oregon City, in the county of Clackamas and State of Oregon, have invented a new and improved Frame for Wheelbarrow; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
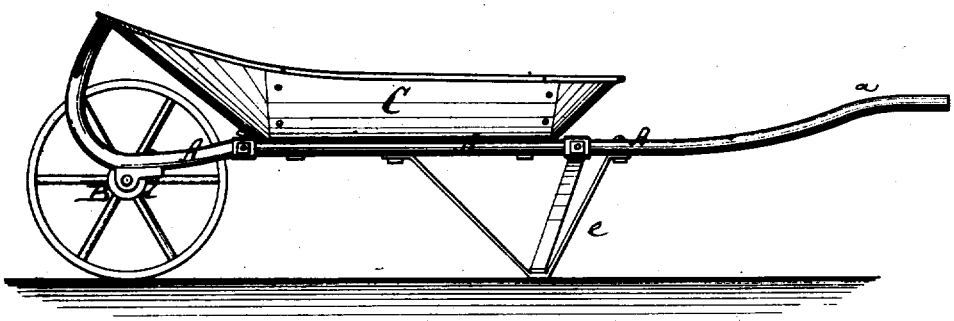
Figure 1 represents a side view of a wheelbarrow constructed with my improved frame.
Figure 2:
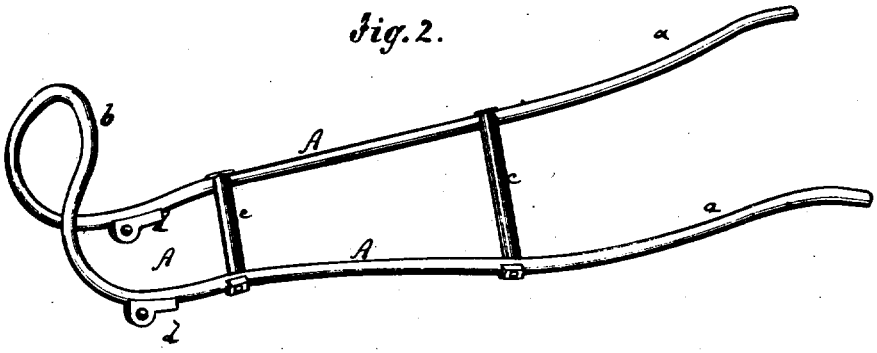
Figure 2 is a perspective view of the said frame.

This invention relates to a new construction of metallic frames for wheelbarrows, and consists in making the two side bars or pieces of the frame, together with the handles, all of one continuous piece of tubing. Great strength and simplicity of construction are thus obtained for wheelbarrows of every kind and style.

A A in the drawing are the side pieces of the main supporting-frame, they being continued backward to form the handles *a a*.

Their front ends are connected transversely, as at *b*.

All the said parts *a*, A *b*, A, and *a* are made of a continuous piece of tubing, and constitute the frame of the wheelbarrow.

The side pieces A are strengthened by suitable transverse braces *c c*.

The boxes *d*, for the support of the front axle B, are secured to the front part of the frame, as shown.

The tray C may be fitted upon, and in suitable manner secured to, the frame.

*e e* are feet, secured to the underside of the frame, for supporting the wheelbarrow in a horizontal position.

The transverse connection *b* of the side pieces *a* in front of the frame can be turned up, as shown, to serve not only for connecting and strengthening the front ends of the side pieces, but also to sustain and steady the front of the tray.

Having thus described my invention,

I claim as new and desire to secure by Letters Patent—

The wheelbarrow-frame, composed of the side pieces A with the front connection *b*, all made of one continuous piece of tubing, as specified.

BECKWITH W. TUTHILL.

Witnesses:

GEO. W. MABEE,

T. B. MOSHER.